US006859782B2

(12) United States Patent
Harshaw

(10) Patent No.: US 6,859,782 B2
(45) Date of Patent: *Feb. 22, 2005

(54) METHOD FOR NEW PRODUCT DEVELOPMENT AND MARKET INTRODUCTION

(76) Inventor: Bob F. Harshaw, 717 S. Main St., Ottawa, KS (US) 66067

( * ) Notice: Subject to any disclaimer, the term of this patent is extended or adjusted under 35 U.S.C. 154(b) by 622 days.

This patent is subject to a terminal disclaimer.

(21) Appl. No.: 09/740,420

(22) Filed: Dec. 19, 2000

(65) Prior Publication Data

US 2001/0010041 A1 Jul. 26, 2001

Related U.S. Application Data

(63) Continuation-in-part of application No. 09/413,135, filed on Oct. 6, 1999, now Pat. No. 6,542,871.

(51) Int. Cl.$^7$ .............................................. G06F 17/60
(52) U.S. Cl. .................... 705/7; 705/1; 705/10
(58) Field of Search ........................................ 705/10

(56) References Cited

U.S. PATENT DOCUMENTS

| | | | | | |
|---|---|---|---|---|---|
| 3,850,433 | A | * | 11/1974 | Purlia .......................... | 273/256 |
| 5,208,765 | A | * | 5/1993 | Turnbull ....................... | 702/84 |
| 6,044,354 | A | * | 3/2000 | Asplen, Jr. ..................... | 705/7 |
| 6,298,327 | B1 | * | 10/2001 | Hunter et al. ................... | 705/1 |
| 2002/0004775 | A1 | * | 1/2002 | Kossovsky et al. ............ | 705/37 |

FOREIGN PATENT DOCUMENTS

EP       467584 A2  *  1/1992  ............ G07C/3/00

OTHER PUBLICATIONS

Niemann, Paul. "The Online Inventor," May 1999, Retrieved from the Internet: <URL: http://www.market-launchers.com>.*
Aurora Funds [online], [retrieved on Jan. 10, 2002]. Retrieved from the Internet: <URL: http://www.aurorafunds.com>.*
Iventurelab [online], [retrieved on Jan. 10, 2002]. Retrieved from the Internet: <URL: http://www.iventurelab.com>.*
Hayes, Susan. "The source 1993," Success, vol. 40 No. 6, Aug. 1993, pp. 37–40.*
Carlson, Steven. "Patent pools and the antitrust dilemma," Yale Journal on Regulation v16n2, Summer 1999, [retrieved from Dialog].*

(List continued on next page.)

Primary Examiner—Tariq R. Hafiz
Assistant Examiner—Catherine M. Colón
(74) Attorney, Agent, or Firm—Dale J. Ream

(57) ABSTRACT

A method for developing new products for introduction into the marketplace comprises providing a plurality of pools with each pool serving as a repository for new product concepts, ideas, or partially developed products. A predetermined number of new product concepts are registered into each pool according to predetermined subject matter associated therewith. One concept is selected from each pool for further development. Each selected concept is engineered to optimize its intended utility function and a degree of proprietary protection is then acquired therefor. Having obtained proprietary protection for the selected concept, the concept is marketed to potential manufacturers for the purpose of obtaining a license therewith. A licensee obtains the rights to manufacture and distribute the product in exchange for royalties on sales thereof. Royalties on sales are distributed first to the submitter of the selected concept and, in smaller proportions, to the other pool submitters and pool manager.

16 Claims, 3 Drawing Sheets

OTHER PUBLICATIONS

DeSouza, Glenn. "Royalty methods for intellectual property." Business Economics, v32, n2, p46(7), Apr. 1997.*

Garage Technology Ventures [online], [retrieved on Jan. 10, 2002]. Retrieved from the Internet: <URL: http://www.garage.com>.*

Think Tank [online], [retrieved on Jan. 10, 2002]. Retrieved from the Internet: <URL: http://www.thinktank.com>.*

Katalyst [online], [retrieved on Jan. 10, 2002]. Retrieved from the Internet: <URL: http://www.katalyst.com>.*

Eisman, Regina. "Remaking a Corporate Giant." Incentive, v166, May 1992, p 57(5).*

DiEdoardo, Chris. "Professors' royalties protected by court." San Diego Daily Transcript, Oct. 6, 1997.*

GE—Submitted Ideas Program [online], [retrieved on Jun. 13, 2002]. Retrieved from the Internet: <URL: http://www.ge.com/subideas.htm>.*

Whiddon, Robert L. "Venture-backed IPO: Garage.com Swings Open IPO Door," Private Equity Week, Feb. 21, 2000.*

* cited by examiner

METHOD FOR NEW PRODUCT DEVELOPMENT AND MARKET INTRODUCTION

CROSS-REFERENCE TO RELATED APPLICATIONS

This application is a continuation-in-part of application Ser. No. 09/413,135, filed Oct. 6, 1999, now U.S. Pat. No. 6,542,871.

BACKGROUND OF THE INVENTION

This invention relates to a unique method for selecting and developing new products for introduction into the marketplace.

Each year individuals and small businesses conceive of thousands of ideas or concepts for new products. Few of these new product ideas, however, are ever developed and brought into the marketplace. Consequently, few inventors ever realize any financial gain as a result of their inventions. There are a variety of reasons why so few new product ideas progress to ultimate market introduction. A significant barrier is the financial expense relative to new product development which includes evaluation of marketability, patentability, and technical feasibility. Additional expense is incurred relative to product design, proprietary protection of the intellectual property encompassing the product, prototype development, etc. Further, few inventors pursue development of their new product ideas because completion of the above mentioned steps does not guarantee success in the marketplace. Only the "best" new products are ultimately successful.

Therefore, it is desirable to have a method for new product development which increases the expectation of financial return and decreases the cost of product development to individual inventors. Further, it is desirable to have a method for new product development which provides financial return to all inventor participants even if only a single new product idea progresses to market introduction.

SUMMARY OF THE INVENTION

It is therefore a general object of this invention to provide a method for developing new products for introduction into the marketplace.

Another object of this invention is to provide a method, as aforesaid, for accumulating new product ideas in a pool.

Still another object of this invention is to provide a method, as aforesaid, for selecting a new product idea from the pool for further development and market introduction.

Yet another object of this invention is to provide a method, as aforesaid, for developing a selected new product idea through concept design engineering.

A further object of this invention is to provide a method, as aforesaid, for acquiring a degree of proprietary protection for the intellectual property which encompasses a selected new product idea.

A still further object of this invention is to provide a method, as aforesaid, for licensing the right to make, use, sell, and/or distribute a selected new product to a manufacturer.

A particular object of this invention is to provide a method, as aforesaid, for distributing royalty revenue generated from the licensing of the selected new product to the registrant of the selected idea, the registrants of non-selected ideas, and the pool manager.

Other objects and advantages of this invention will become apparent from the following description taken in connection with the accompanying drawings, wherein is set forth by way of illustration and example, an embodiment of this invention.

These objects are accomplished according to a method in which one or more pools or funds are established into which ideas, concepts, or partially developed products are registered by individual or small business registrants. Each pool receives new product ideas related to a particular technology area or patent classification. When a predetermined number of new product registrations have been received within a pool, the marketability, patentability, and technical feasibility are evaluated by a pool manager and at least one idea is selected, based on the evaluation, for product development and market introduction. Alternatively, the selection of an idea for development may be made by designing a market survey for each idea within a pool according to a multi-variant analysis methodology and then submitting the survey to each pool registrant for response. The results of these responses can be statistically analyzed by the pool manager for selecting the idea to be developed. Product development is funded by new idea registration fees.

The selected registration is developed through design engineering so as to optimally fulfill its utility function and market niche. When the selected registration has been fully developed into a viable new product, the intellectual property encompassing the invention may be legally protected by filing and prosecuting one or more United States or foreign patent applications.

Upon issuance of a patent relative to the selected registration, the right to make, use, sell, and/or distribute the product encompassed by the patent is licensed to a manufacturer for ultimate market introduction. The pool manager undertakes efforts to identify and market the new product to potential licensees. The rights granted by the license are given to a manufacturer in exchange for royalties on sales of the new product during the term of the patent. A portion of the royalties generated through product sales is distributed first to the owner of the patent covering the selected new product registration. A second portion of the royalties that is smaller than the first portion is equally distributed to the pool registrants whose new product ideas were not selected for further development and market introduction. A third portion of the royalties that is smaller than the first portion is distributed to the manager of the pool. Thus, while the party who initially registered the new product idea receives the largest portion of eventual royalty revenues, each registrant in the pool receives a portion as well over the term of the patent. All of these royalty distribution may be accomplished according to individual license agreements between individual registrants and a respective pool.

DESCRIPTION OF THE PREFERRED EMBODIMENT

Figure 1:
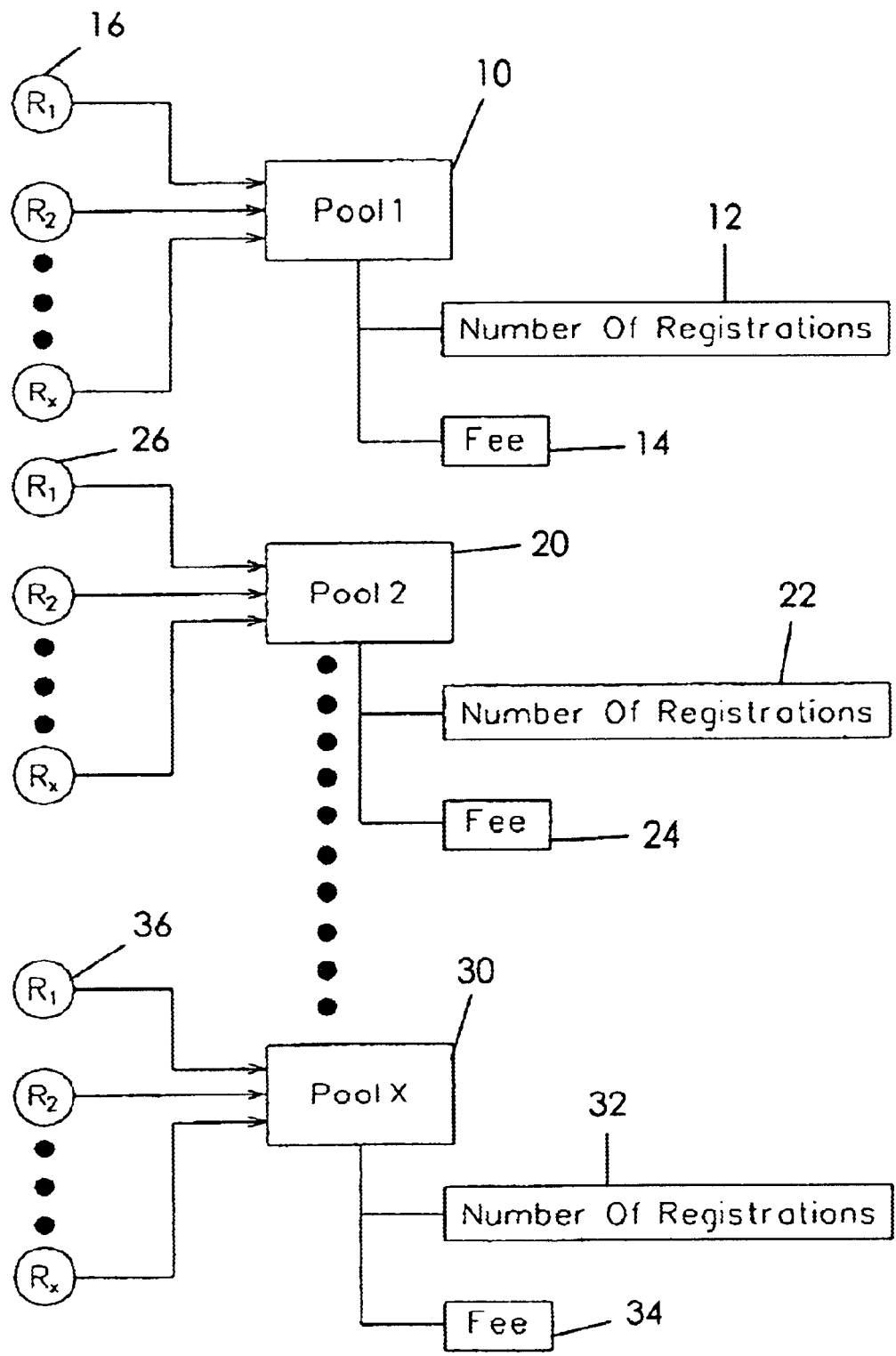
FIG. 1 is a block diagram showing a plurality of distinct pools into which new product ideas are registered according to one embodiment of the invention.

Turning more particularly to the drawings, FIG. 1 shows the establishment of a plurality of pools 10, 20, 30 each pool being associated with a distinct subject matter, such as a general technology type or patent classification. Each pool 10, 20, 30 is a repository for new product ideas, concepts, or partially developed products which are related to the subject matter of the pool. As used herein, the term "product" includes any useful process, machine, manufacture, or composition of matter, and any useful improvement thereof. Individuals or small business registrants 16, 26, 36 having a new product idea may register the idea with the appropriate pool. New product ideas are preferably submitted electronically using a computer data processing system accessible through a wide area computer network, although ideas may also be submitted through traditional modes of communication such as mail or facsimile. Each registration includes at least a written description of the idea, concept, or partially developed product. Each pool 10, 20, 30 is managed by a pool manager 40 (FIG. 2) who will accept only legitimate new product ideas that are relevant to the subject matter of the pool.

Registration of new product ideas within each pool 10, 20, 30 is governed by a set of parameters that are predetermined by the pool manager 40. Pool parameters include, but are not limited to, the minimum number of registrations 12, 22, 32 that must be received into the pool and the fees 14, 24, 34 charged to a registrant upon registration. Since the registration fees 14, 24, 34 will be used to fund later product development, as to be described below, a pool remains "open" until the minimum number of registrations are received. Further, the amount of the registration fee is variable based upon the particular subject matter of the pool and the corresponding estimated cost of product development. If a pool remains open longer than a predetermined amount of time, the pool manager may selectively terminate the pool and refund all registration fees, extend the period of time to receive the predetermined number of registrations, or merge the pool with another pool such that the predetermined number of registrations is satisfied.

When a pool has accepted the predetermined number of registrations and is therefore "closed", one registered new product idea is selected for further development and market introduction. This selection is denoted as $R_y$ 50 in FIG. 2. In selecting an idea for further development, all ideas in the pool are analyzed relative to marketability, patentability, and technical feasibility. These analytical factors serve to identify the new product idea that, upon further development, will produce the most successful new product to introduce into the marketplace.

Once an idea has been selected ($R_y$) for further development, all registrants are notified of the selection. This notification is general in nature as the details of the selected new product idea are confidential pending proprietary protection therefor. The registrant of the selected idea 50, however, is notified more specifically and is consulted by the pool manager 40 during the development process.

Figure 2:
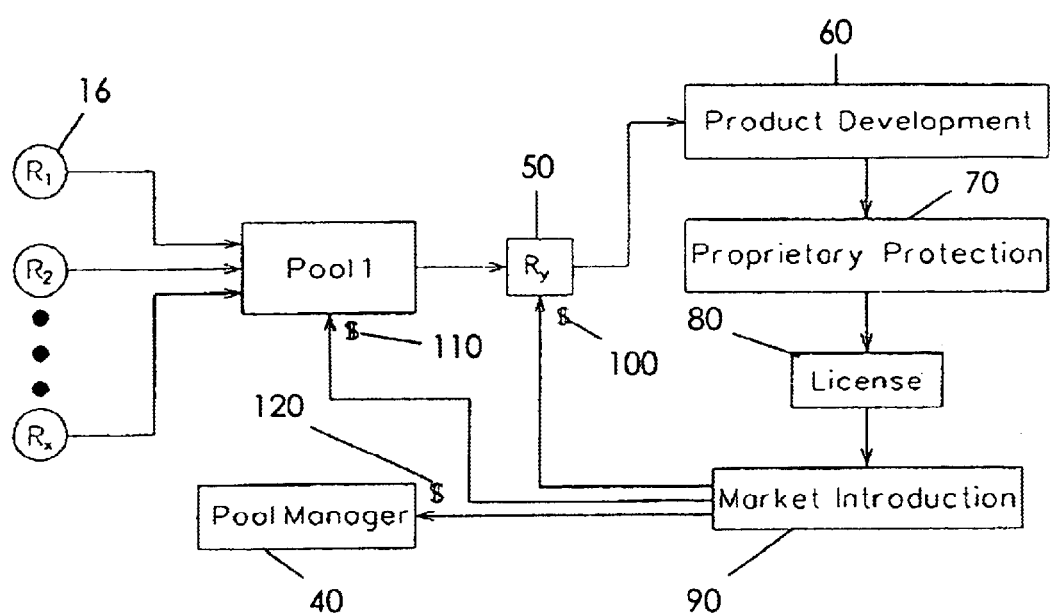
FIG. 2 is a block diagram illustrating the development and market introduction of a new product idea selected from a pool.

Using innovative design and engineering methods, the selected idea 50 is optimized to satisfy the specific utility function of the product while maintaining the marketability thereof, as denoted by reference number 60 in FIG. 2. With the invention fully defined, the next step in the development process is to acquire a degree of proprietary protection 70 for the intellectual property which encompasses the selected idea 50. Acquisition of proprietary protection 70 may entail the preparation, filing, and prosecution of at least one United States or foreign patent application relative to the selected idea 50. Trademarks relative to the selected idea 50 may also be acquired. The selected idea 50 is thus transformed from a mere product idea in a pool of many ideas, into a developed new product or product idea suitable for introduction into the marketplace with a degree of proprietary protection.

Once a satisfactory degree of proprietary protection is obtained, the selected idea 50 is licensed 80 to a manufacturer. The manufacturer will be granted the right to make, use, sell, and distribute the selected new product in a specified geographic territory. Accordingly, the selected product 50 will be introduced into the marketplace, as denoted by reference number 90 in FIG. 2. The license will require the manufacturer (i.e. the licensee) to pay royalties, which may be in the form of a single lump sum payment or a series of payments over time, in exchange for the right to commercialize the selected product 50. A first portion 100 of the royalties (e.g. 50%) is distributed to the registrant of the selected idea 50. A second portion 110 of the royalties that is smaller than the first portion (e.g. 25%) is distributed equally amongst the remaining registrants 16 within the pool 10. A third portion 120 of the royalties that is also smaller than the first portion (e.g. 25%) is distributed to the pool manager 40 as a commission. Preferably, the distribution of royalties to registrants may be made pursuant to individual license agreements between registrants and the pool although other governing agreements may be used.

Figure 3:
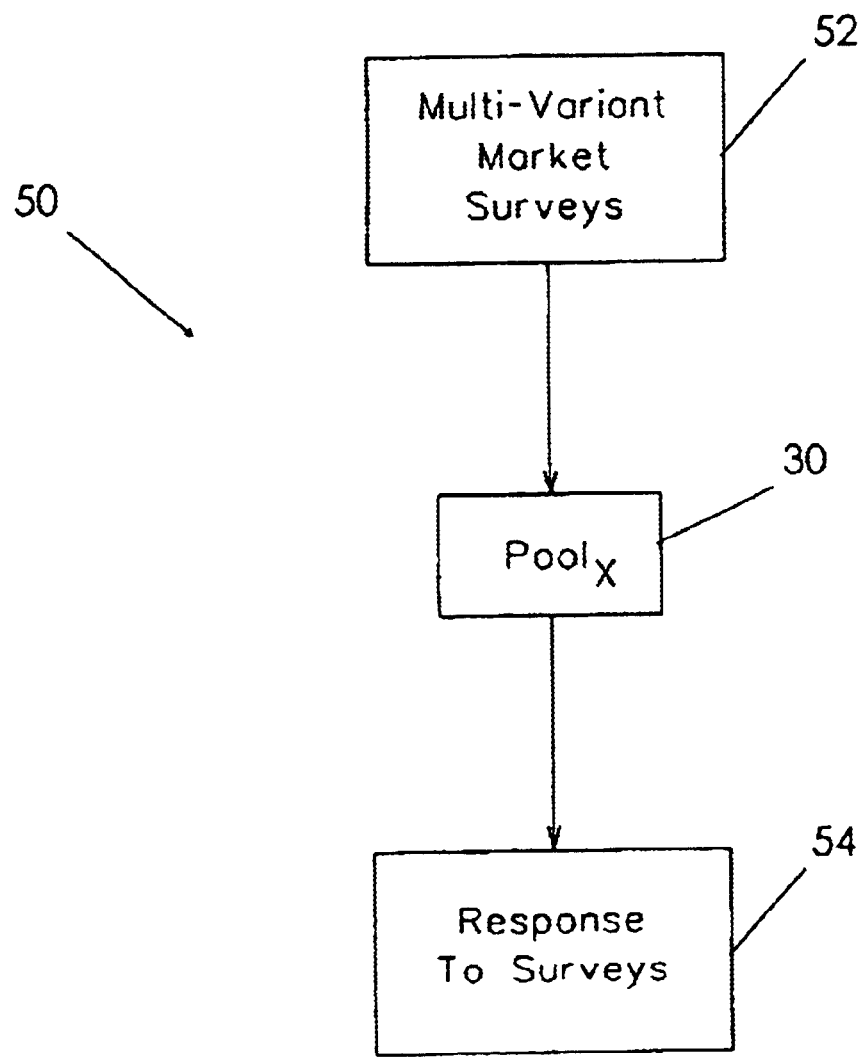
FIG. 3 is a block diagram illustrating the step of selecting a new product idea for further development according to another embodiment of the invention.

Another embodiment of the invention is substantially similar to the method described above except as specifically noted below. In this embodiment, the selection of a new product idea for further development, denoted as $R_y$ in FIG. 2, is accomplished as shown in FIG. 3. First, a market survey 52 employing the methodology of multi-variant analysis is designed for each new product idea submitted to a pool 30. More particularly, each market survey 52 utilizes conjoint analysis, which is a type of multi-variant analysis utilizing statistical fractionalization, to define a quantitative utility value represented in statistical terms for selected attributes associated with a respective new product idea, concept, or invention. A typical conjoint analysis may include five attributes measured at three different significant levels. For example, a new laptop computer configuration may be represented by the following conjoint analysis:

attribute a—price
   level 1 $1,000, level 2=$2,000, level 3=$3,000
attribute b—name
   level 1=Toshiba, level 2=Gateway, level 3=IBM
attribute c—peripheral ports
   level 1 cd, level 2 cd/floppy drive, level 3 floppy drive
attribute d—colors
   level 1 standard neutral, level 2 decorative, level 3 black
attribute e—RAM configuration
   level 1 64 MB, level 2 128 MB, level 3 32 MB A conjoint analysis market survey 52 for each new product submission within a pool 30 is transmitted electronically to each registrant 36 within that pool 30 and a response thereto is solicited (FIG. 3). Of course, the surveys may be sent in hard copy form as well. In making a response to this solicited market research, registrants 36 rate and rank their preferences of the various combinations of attributes and levels presented, these determinations representing the likelihood of purchasing a product with those respective attributes. When responses from the registrants 36 are returned 54, they may be analyzed electronically according to respective statistical utility function values or by the pool manager such that the best new product idea is selected for further development 60.

Accordingly, it can be seen that the method according to the present invention provides for the selection and development of a new product having the greatest potential for market success relative to a pool of related new product ideas.

It is understood that while certain forms of this invention have been illustrated and described, it is not limited thereto except insofar as such limitations are included in the following claims and allowable functional equivalents thereof.

Having thus described the invention, what is claimed as new and desired to be secured by letters patent is as follows:

1. An automated method for developing a new product, comprising:
   receiving electronically, using a computer accessible through a wide area network, a plurality of new product concepts from a plurality of submitters, said plurality of new product concepts administered by a manager;
   selecting one new product concept from said plurality of new product concepts for market introduction;
   transforming said selected new product concept into a developed new product suitable for introduction to the marketplace;
   introducing said developed new product to the marketplace to find an interested party; and
   licensing said developed new product to said interested party for manufacture, distribution, and sale in the marketplace, said license including parameters for making payment of a first royalty to the submitter of said selected new product concept and making payment of a second royalty smaller than said first royalty to the submitters of each new product concept not selected and making payment of a third royalty smaller than said first royalty payable to said manager.

2. The method as in claim 1 wherein selecting one new product concept for market introduction comprises:
   formulating a market survey relative to each new product concept;
   submitting each market survey to each of said plurality of submitters and soliciting a response relative thereto; and
   analyzing said responses to said market surveys whereby to select said one new product concept for market introduction.

3. A method as in claim 2 wherein each market survey includes a conjoint analysis component having multiple attributes and multiple levels designed to predict the marketability of a respective new product concept.

4. A method as in claim 2 further comprising providing a plurality of pools, each pool associated with a predetermined subject matter and receiving only new product concepts having substantially similar subject matter.

5. A method as in claim 2 wherein receiving a plurality of new product concepts includes receiving new product concepts only upon payment of a registration fee, and said step of receiving a plurality of new product concepts is repeated until a predetermined number of new product concepts has been received.

6. A method as in claim 4 wherein presenting said developed new product to the marketplace comprises:
   marketing said developed new product to at least one potential manufacturer so as to influence said potential manufacturer to execute a licensing agreement relative to said developed new product.

7. A method as in claim 2 wherein transforming the selected new product concept into a developed new product, comprises:
   engineering said selected new product concept to optimize the utility function thereof through application of innovative design methodology and consultation with the submitter of said selected new product concept; and
   obtaining a degree of proprietary protection for said selected new product concept by filing and prosecuting at least one patent application covering novel elements of said selected new product concept.

8. A method as in claim 2 further comprising notifying said plurality of submitters when one new product concept has been selected and identifying said selected new product concept.

9. A automated method for developing new products, comprising:
   providing a plurality of pools, each pool associated with a predetermined subject matter and administered by a pool manager;
   electronically receiving a predetermined number of new product concepts into each said pool, each said new product concept being registered by a submitter to one of said pools having a subject matter in common with the subject matter of said new product concept;
   formulating a market survey relative to each new product concept;
   submitting each market survey to each of said plurality of submitters and soliciting a response relative thereto;
   analyzing said responses to said market surveys whereby to select said one new product concept for market introduction;
   transforming each said selected new product concept into a developed new product suitable for introduction to the marketplace;
   introducing each said selected new product concept into the marketplace whereby to obtain sales transactions therefor; and
   wherein distribution parameters include making payment of a first royalty to the submitter of said selected new product concept and making payment of a second royalty smaller than said first royalty in equal amounts to the submitters of each new product concept not selected and making payment of a third royalty smaller than said first royalty payable to said pool manager.

10. A method as in claim 9 wherein introducing each said developed new product concept into the marketplace further comprises:
    marketing each said developed new product to at least one potential manufacturer so as to influence said potential manufacturer to execute a licensing agreement relative to said developed new product; and
    licensing each said developed new product to a manufacturer for manufacture, distribution, and sale in a market mutually selected by said pool manager and said manufacturer, each said license including parameters for distributing revenue derived from sale transactions relative to said developed new product.

11. A method as in claim 9 wherein transforming the selected new product concept into a developed new product comprises:
    engineering each said selected new product concept to optimize the utility function thereof through application of innovative design methodology; and obtaining a degree of proprietary protection for each said selected new product concept by filing and prosecuting at least one patent application covering the novel elements of each said selected new product concept.

12. A method as in claim 11 wherein receiving said new product concepts into said pools includes requiring payment of a registration fee for each new product concept registered by a submitter, said registration fees being used to fund said steps of engineering each said selected new product concept and obtaining a degree of proprietary protection for each said selected new product concept.

13. A method as in claim 9 wherein receiving said new product concepts into said pools includes requiring payment of a registration fee for each new product concept registered by a submitter, the registration fee being dependent upon the subject matter associated with the pool into which a new product concept is registered.

14. A method as in claim 9 further comprising combining two or more pools into a single pool if a predetermined number of new product concepts are not received into a single pool within a predetermined period of time.

15. A method as in claim 9 further comprising notifying said new product concept submitters associated with each pool when one new product concept has been selected from said pool and identifying said selected new product concept.

16. A method as in claim 9 wherein each market survey includes a conjoint analysis component having multiple attributes and multiple levels designed to predict the marketability of a respective new product concept.

* * * * *